US009333610B2

(12) United States Patent
Akagawa

(10) Patent No.: US 9,333,610 B2
(45) Date of Patent: May 10, 2016

(54) WORKPIECE POSITIONING DEVICE POSITIONING WORKPIECE AT TWO REFERENCE SURFACES

(71) Applicant: FANUC CORPORATION, Yamanashi (JP)

(72) Inventor: Naoki Akagawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/606,235

(22) Filed: Jan. 27, 2015

(65) Prior Publication Data

US 2015/0209926 A1 Jul. 30, 2015

(30) Foreign Application Priority Data

Jan. 29, 2014 (JP) .................................. 2014-014734

(51) Int. Cl.
*B23Q 3/06* (2006.01)
*B23Q 3/18* (2006.01)
(Continued)

(52) U.S. Cl.
CPC ................ *B23Q 3/186* (2013.01); *B23Q 3/062* (2013.01); *B23Q 16/004* (2013.01); *B25B 5/003* (2013.01); *B25B 5/04* (2013.01)

(58) Field of Classification Search
CPC ...... B23Q 3/186; B21D 43/003; B21D 43/10; B25B 5/04; B25B 5/08; B25B 5/003
USPC ........... 269/111, 109, 103, 55, 313, 314, 291, 269/297
See application file for complete search history.

(56) References Cited

U.S. PATENT DOCUMENTS 4,602,555 A * 7/1986 Bushey ..................... B06B 1/18
108/20
4,610,442 A * 9/1986 Oku ..................... B23Q 1/4866
269/73

(Continued)

FOREIGN PATENT DOCUMENTS

JP  61-42232 U   3/1986
JP  61136752 A   6/1986

(Continued)

OTHER PUBLICATIONS

English abstract and machine translation for Japanese Publication No. JP 5-50351 published Mar. 2, 1993, 8 pages.

(Continued)

*Primary Examiner* — Lee D Wilson
*Assistant Examiner* — Seahee Yoon
(74) *Attorney, Agent, or Firm* — Fredrikson & Byron, P.A.

(57) ABSTRACT

A workpiece positioning device (1) includes a first positioning block (Bx) positioning one surface of a workpiece at a first reference surface in a first direction, two second positioning blocks (By1, By2) positioning a different surface of the workpiece at a second reference surface in a second direction, seat blocks (Bz1, Bz2, Bz3) positioning the workpiece in a third direction perpendicular to the first direction and the second direction, a push cylinder (30) pressing the workpiece in one direction toward an intersection line between the first and the second reference surface, a first unit (10) contacting with the one surface of the workpiece and correcting a posture of the workpiece before the first positioning block contacts with the workpiece, and a second unit (20) contacting with the different surface of the workpiece and correcting the posture of the workpiece before the second positioning blocks contact with the workpiece.

4 Claims, 8 Drawing Sheets

(51) Int. Cl.
  *B23Q 16/00* (2006.01)
  *B25B 5/00* (2006.01)
  *B25B 5/04* (2006.01)

(56) References Cited

U.S. PATENT DOCUMENTS

| | | | | |
|---|---|---|---|---|
| 4,655,584 | A * | 4/1987 | Tanaka | G03F 7/7075 355/53 |
| 5,031,547 | A * | 7/1991 | Hirose | B23Q 1/4866 108/137 |
| 5,163,651 | A * | 11/1992 | Matsumoto | B23Q 1/38 108/20 |
| 5,201,501 | A * | 4/1993 | Fassler | B25B 5/06 269/156 |
| 5,794,541 | A * | 8/1998 | Hirose | B23Q 1/4866 108/20 |
| 6,601,484 | B1 * | 8/2003 | Katoh | B23B 41/04 409/132 |
| 7,971,863 | B2 * | 7/2011 | Chen | B25B 5/06 269/289 R |
| 8,292,279 | B2 * | 10/2012 | Zhang | B25B 5/08 269/107 |
| 8,335,347 | B2 * | 12/2012 | Grange | G01S 5/163 382/103 |
| 8,744,282 | B2 * | 6/2014 | Tsuchida | G03G 15/0863 399/12 |

FOREIGN PATENT DOCUMENTS

| | | |
|---|---|---|
| JP | H03-281137 A | 12/1991 |
| JP | 550351 A | 3/1993 |
| JP | H05-104380 A | 4/1993 |
| JP | H05-58515 A | 9/1993 |
| JP | H05-337774 A | 12/1993 |
| JP | H09-183035 A | 7/1997 |
| JP | 2003260625 A | 9/2003 |
| JP | 2006341340 A | 12/2006 |
| JP | 2011098430 A | 5/2011 |
| JP | 3169100 U | 6/2011 |

OTHER PUBLICATIONS

English Machine Translation for Japanese Publication No. 2011098430, published May 19, 2011, 19 pages.
English Machine Translation for Japanese Publication No. 2006341340, published Dec. 21, 2006, 15 pages.
English Machine Translation for Japanese Publication No. 2003260625, published Sep. 16, 2003, 12 pages.
English Machine Translation of Abstract for Japanese Publication No. 61136752, published Jun. 24, 1986, 1 page.
English Machine Translation of Japanese Publication No. 3169100, published May 21, 2001, 9 pages.
English Machine Translation for Japanese Publication No. H09-183035, published Jul. 15, 1997, 9 pages.
English Machine Translation for Japanese Publication No. H05-58515, published Sep. 3, 1993, 11 pages.
English Machine Translation of Abstract for Japanese Publication No. H03-281137, published Dec. 11, 1991, 1 page.
English Machine Translation for Japanese Publication No. H05-337774, published Dec. 21, 1993, 6 pages.
English Machine Translation for Japanese Publication No. H05-104380, published Apr. 27, 1993, 9 pages.
Partial English Machine Translation for Japanese Publication No. 61-42232, published Mar. 18, 1986, 1 page.

* cited by examiner

WORKPIECE POSITIONING DEVICE POSITIONING WORKPIECE AT TWO REFERENCE SURFACES

BACKGROUND OF THE INVENTION

1. Field of the Invention

The present invention relates to a workpiece positioning device used in positioning a workpiece at two different reference surfaces.

2. Description of Related Art

In some cases, at the time of machining a workpiece by a machine tool, the workpiece is pressed against two different reference surfaces to be positioned. Japanese Laid-open Patent Publication No. 5-050351 discloses that after a workpiece is placed on a Z-axis reference surface, the workpiece is pressed against an X-axis reference surface by using an X-axis cylinder, and then pressed against a Y-axis reference surface by using a Y-axis cylinder to three-dimensionally position the workpiece.

However, when a workpiece has a special shape, there is a possibility that pressing the workpiece against a reference surface causes rotational movement of the workpiece, and as a result, the workpiece may not be pressed perpendicularly against the reference surface. In such a case, the workpiece is held with a clearance formed between the workpiece and the reference surface, and the workpiece may not be precisely set in a machining jig.

The present invention has been made in view of such circumstances, and has an object to provide a workpiece positioning device capable of positioning a specially-shaped workpiece simultaneously at two different reference surfaces.

SUMMARY OF THE INVENTION

In order to accomplish the above-described object, according to a first aspect, there is provided a workpiece positioning device including: a first positioning block that forms a first reference surface in a first direction and positions one surface of a workpiece at the first reference surface; two second positioning blocks that form a second reference surface in a second direction and position a different surface of the workpiece at the second reference surface; at least one seat block that positions the workpiece in a third direction perpendicular to the first direction and the second direction; a push cylinder that presses the workpiece in one direction toward an intersection line between the first reference surface and the second reference surface; a first unit that, before the first positioning block contacts with the workpiece, contacts with the one surface of the workpiece at friction lower than that of the first positioning block and corrects a posture of the workpiece; and a second unit that, before the second positioning blocks contacts with the workpiece, contacts with the different surface of the workpiece at friction lower than that of the second positioning blocks and corrects the posture of the workpiece.

According to a second aspect, in the first aspect, the first unit includes at least one pair of first rollers that contact with the workpiece, the first positioning block is arranged between the at least one pair of first rollers, the at least one pair of first rollers are each pressed in the first direction toward the workpiece by an elastic member, the second unit includes at least one pair of second rollers that contact with the workpiece, the at least one pair of second rollers are arranged between the two second positioning blocks, and the at least one pair of second rollers are each pressed in the second direction toward the workpiece by an elastic member.

According to a third aspect, in the first aspect, a ball is arranged at a distal end of the push cylinder.

According to a fourth aspect, in the first aspect, the first unit includes one pair of first contacting members that contact with the workpiece, the first positioning block is arranged between the one pair of first contacting members, the one pair of first contacting members are each pressed in the first direction toward the workpiece by an elastic member, the second unit includes second contacting members that contact with the workpiece, the second contacting members are arranged between the two second positioning blocks, and the second contacting members are each pressed in the second direction toward the workpiece by an elastic member.

Based on the detailed description of the representative embodiments of the present invention illustrated in the accompanying drawings, the object, feature, and advantageous effect, and other objects, features, and advantageous effects will be more apparent.

DETAILED DESCRIPTION

In the following, an embodiment of the present invention is described with reference to the accompanying drawings. In the following drawings, the same reference symbols are attached to the same members. In order to facilitate understanding, reduction scales of these drawings are appropriately changed.

Figure 1:
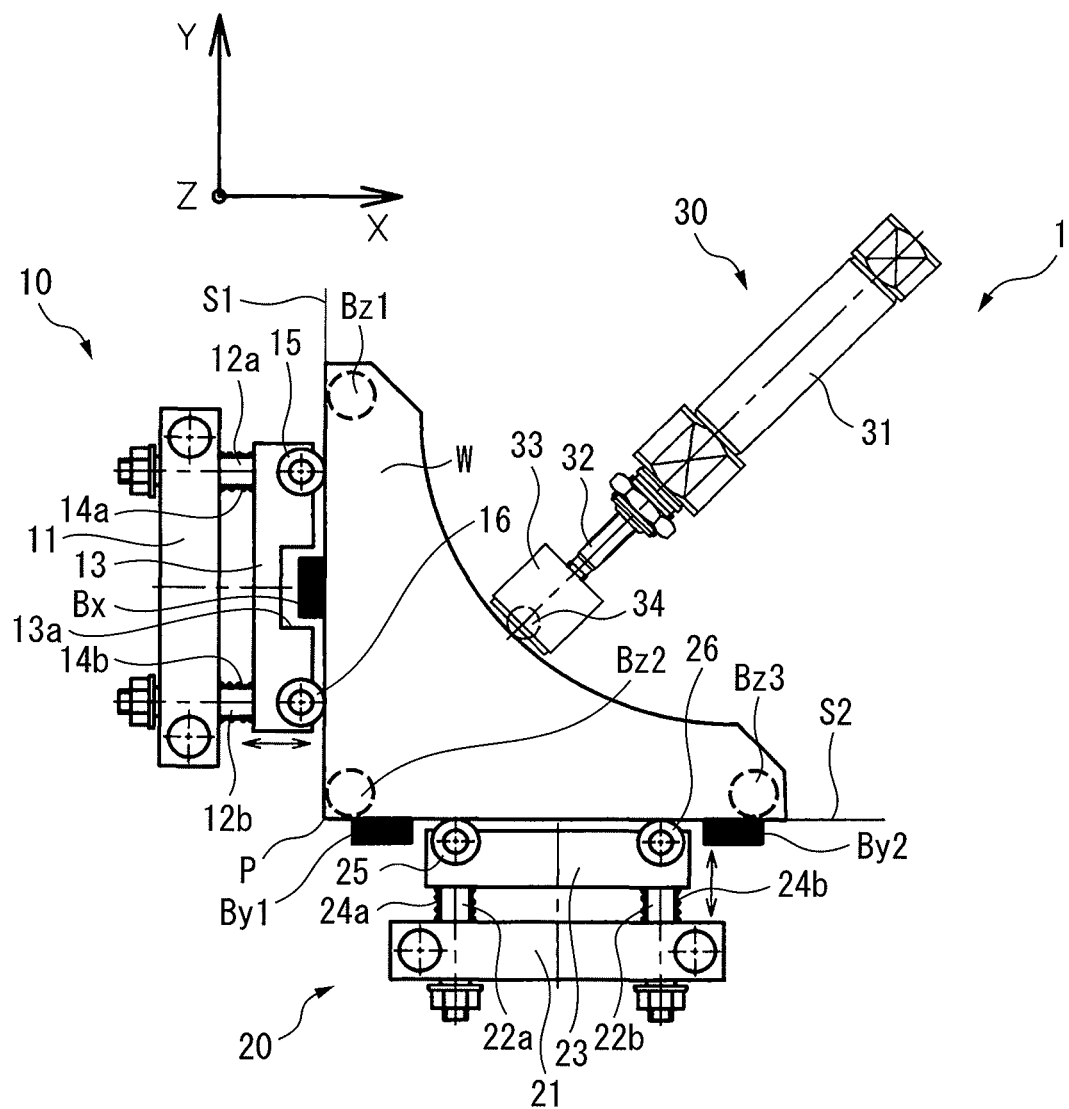
FIG. 1 is an elevational view of a workpiece positioning device based on a representative embodiment of the present invention.

FIG. 1 is an elevational view of a workpiece positioning device based on a representative embodiment of the present invention. As illustrated in FIG. 1, a workpiece positioning device 1 includes a first positioning block Bx that forms a first reference surface S1 perpendicular to an X direction, and two second positioning blocks By1 and By2 that form a second reference surface S2 perpendicular to a Y direction.

Further, the workpiece positioning device 1 includes at least one seat block among seat blocks Bz1 to Bz3, the seat block positioning a workpiece W in a Z direction. These three seat blocks Bz1 to Bz3 form a Z-direction reference surface (not illustrated in the drawing) perpendicular to the Z direction.

In FIG. 1, the three seat blocks Bz1 to Bz3 are arranged in a shape of an approximately right-angled triangle. The positional relation of the three seat blocks Bz1 to Bz3 corresponds to a shape of the workpiece W, described below. It is assumed that these seat blocks Bz1 to Bz3 and the fixing blocks Bx, By1, and By2 are located at fixed positions, and friction coefficients of the surfaces of them are relatively large.

Figure 2:
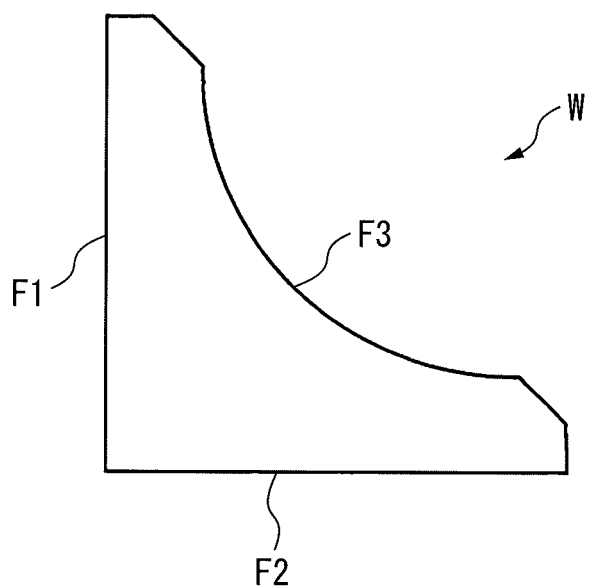
FIG. 2 is an enlarged view of a workpiece.

FIG. 2 is an enlarged view of the workpiece. The workpiece W illustrated in FIG. 2 has an approximately L-shaped section, and includes flat workpiece side surfaces F1 and F2 that are perpendicularly adjacent to each other, and a curved side surface F3 that is connected to these workpiece side surfaces F1 and F2 and is curved inwards. As understood from FIG. 2, the workpiece W has a shape that is line symmetry with respect to a bisector of an angle made by the workpiece side surfaces F1 and F2. It is assumed that an end surface of the workpiece W is flat.

The workpiece positioning device 1 based on the present invention is used for positioning the workpiece side surfaces F1 and F2 of the workpiece W at the first reference surface S1 and the second reference surface S2, respectively. Accordingly, as long as the workpiece W has the workpiece side surfaces F1 and F2 that are perpendicularly adjacent to each other, the workpiece W may have a different shape.

Alternatively, the workpiece side surfaces F1 and F2 may be adjacent to each other so as to make an angle other than a right angle. In this case, the blocks Bx, By1, and By2 are arranged such that the first reference surface S1 and the second reference surface S2 have the same angle as the angle of the workpiece side surfaces F1 and F2. In the following, description is made on the assumption that the workpiece side surfaces F1 and F2 are perpendicular to each other.

With reference to FIG. 1 once more, the workpiece positioning device 1 includes a first correcting unit 10 that corrects a posture of the workpiece W. As understood from FIG. 1, the first correcting unit 10 is arranged on the opposite side of the workpiece W with respect to the first reference surface S1. In other words, the first positioning block Bx is arranged between the first correcting unit 10 and the workpiece W.

As illustrated in FIG. 1, the first correcting unit 10 includes a first base 11, two post members 12a and 12b extending from the first base 11 toward the workpiece W, and a common pressing member 13 attached to distal ends of the post members 12a and 12b. As understood from FIG. 1, at a distal end of the pressing member 13, two first rollers 15 and 16 are attached so as to be freely rotatable. Rotational axes of the two first rollers 15 and 16 are in parallel with the Z direction.

As illustrated in FIG. 1, a concave part 13a larger than the first positioning block Bx is formed at the pressing member 13 of the first correcting unit 10. For this reason, even when the pressing member 13 approaches the workpiece W as closely as possible, the pressing member 13 does not interfere with the workpiece W.

At the post members 12a and 12b, elastic members, e.g., springs 14a and 14b, are attached respectively. Accordingly, by the springs 14a and 14b, the pressing member 13 is pressed toward the workpiece side surface F1 of the workpiece W. For this reason, in an initial state in which the workpiece W does not exist, the distal ends of the first rollers 15 and 16 are located at more workpiece-side positions than the first reference surface S1 (more right-side positions than the first reference surface S1).

Further, the workpiece positioning device 1 includes a second correcting unit 20 that corrects a posture of the workpiece W. As understood from FIG. 1, the second correcting unit 20 is arranged on the opposite side of the workpiece W with respect to the second reference surface S2. The second correcting unit 20 is arranged between the two second positioning blocks By1 and By2.

As illustrated in FIG. 1, the second correcting unit 20 includes a second base 21, two post members 22a and 22b extending from the second base 21 toward the workpiece W, and a common pressing member 23 attached to distal ends of the post members 22a and 22b. As understood from FIG. 1, at a distal end of the pressing member 23, second rollers 25 and 26 are attached so as to be freely rotatable. Rotational axes of the two rollers 25 and 26 are in parallel with the Z direction.

At the post members 22a and 22b, elastic members, e.g., springs 24a and 24b, are attached respectively. Accordingly, due to the springs 24a and 24b, the pressing member 23 is pressed toward the workpiece side surface F2 of the workpiece W. For this reason, in the initial state in which the workpiece W does not exist, the distal ends of the second rollers 25 and 26 are located at the more workpiece-side positions than the second reference surface S2 (more upper-side positions than the second reference surface S2).

Further, as illustrated in FIG. 1, the workpiece positioning device 1 includes a push cylinder 30 that presses the workpiece W in one direction. The push cylinder 30 includes a cylinder 31, a rod 32 inserted into the cylinder 31, and a head 33 attached to a distal end of the rod 32. The cylinder 31 expands and contracts the rod 32 by a fluid-pressure type or different mechanism. At a distal end of the head 33, a ball roller 34 is attached so as to be freely rotatable. The ball roller 34 plays a role of smoothly pressing the workpiece W without damaging the workpiece W. In the case of positioning the workpiece W having the shape illustrated in FIG. 1, the ball roller 34 is greatly beneficial for pressing the curved side surface F3 of the workpiece W.

As understood from FIG. 1, the push cylinder 30 is arranged such that an axis of the push cylinder 30 intersects with an intersection line P between the first reference surface S1 and the second reference surface S2. For this reason, when driving the push cylinder 30, the rod 32 is expanded so that the head 33 presses the workpiece W toward the intersection line P. The axis of the push cylinder 30 is preferably arranged on the bisector of an angle between the first reference surface S1 and the second reference surface S2. Accordingly, the push cylinder 30 operates so as to press the workpiece W toward both the first reference surface S1 and the second reference surface S2, simultaneously.

Figure 3:
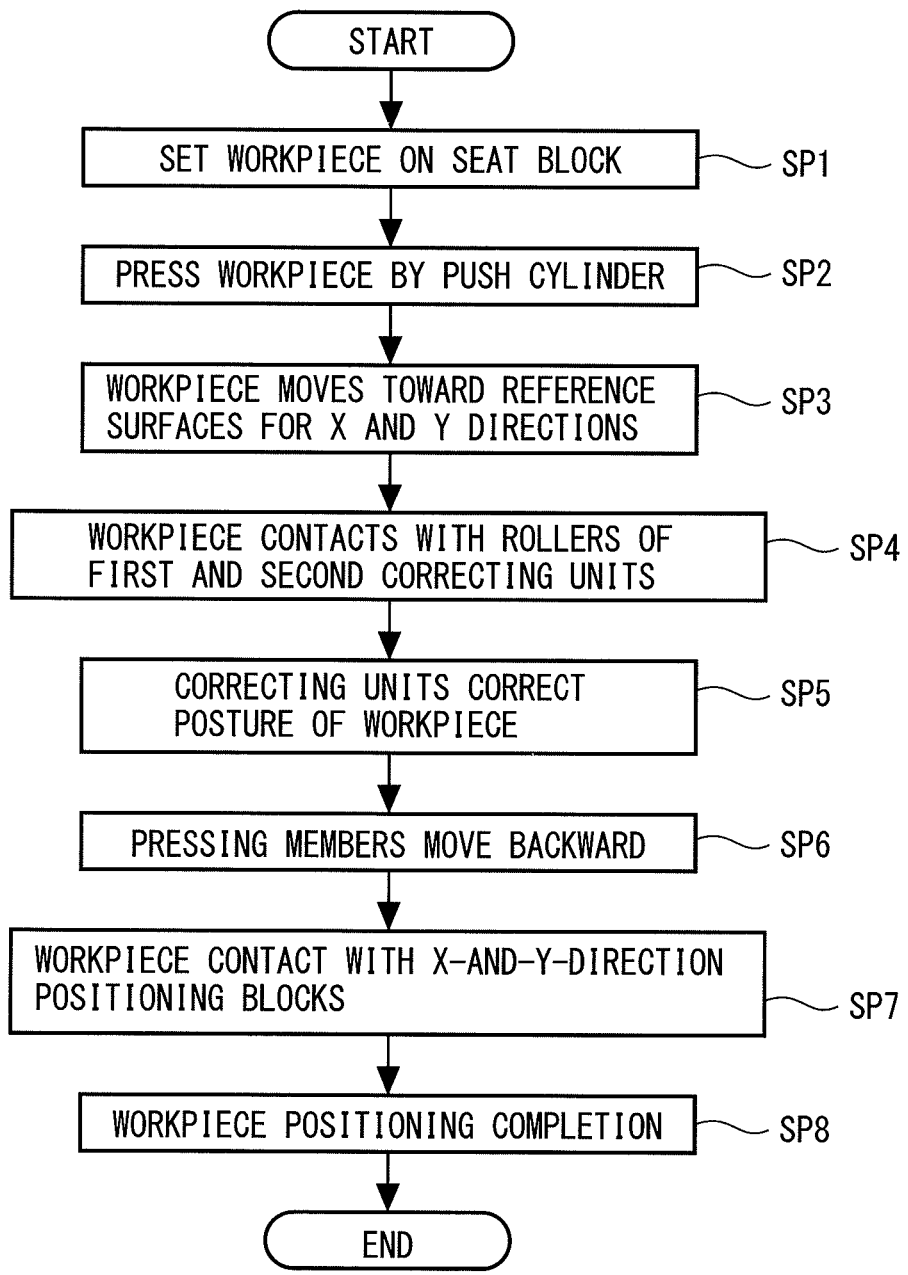
FIG. 3 is a flowchart illustrating operation of the workpiece positioning device based on the representative embodiment of the present invention.

FIG. 3 is a flowchart illustrating operation of the workpiece positioning device based on the representative embodiment of the present invention. At the step SP1 of FIG. 3, the workpiece W is arranged at the seat blocks Bz1 to Bz3. Then, at the step SP2, the push cylinder 30 is driven to expand the rod 32. As a result, the head 33 presses the curved side surface F3 of the workpiece W. Thereby, the workpiece W starts to move toward both of the first reference surface S1 and the second reference surface S2 (step SP3).

By the way, even when the push cylinder 30 presses the workpiece W at the step SP2, the workpiece side surfaces F1 and F2 of the workpiece W do not always match with the first reference surface S1 and the second reference surface S2. This is caused by influence of positional relation between the positioning blocks Bx, By1, and By2 and the workpiece W, and friction force acting between the positioning blocks Bx, By1, and By2 and the workpiece W.

Figure 4:
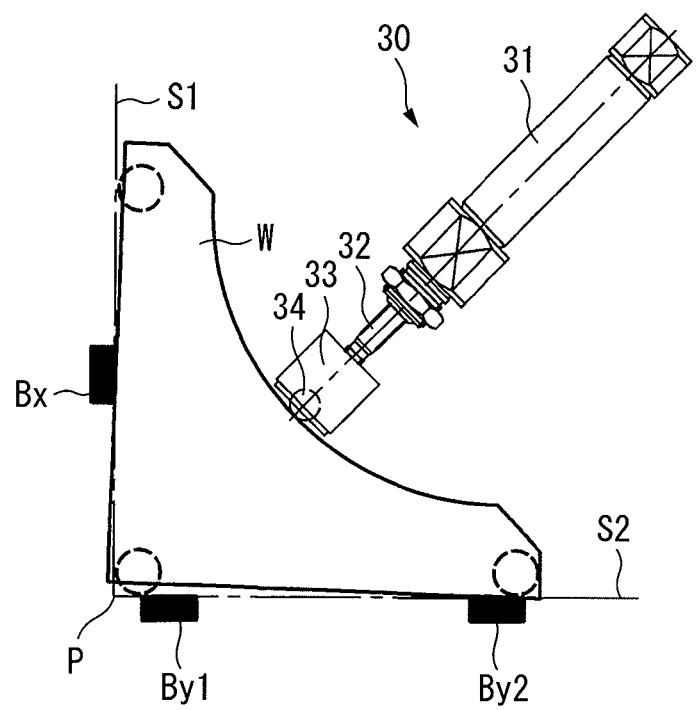
FIG. 4 is a first view illustrating relation between positioning blocks and the workpiece.
Figure 5:
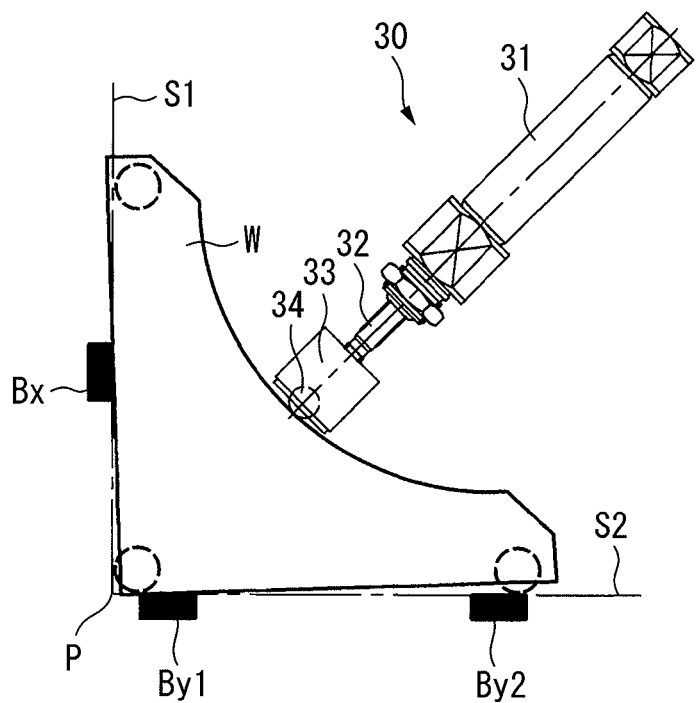
FIG. 5 is a second view illustrating relation between positioning blocks and the workpiece.

FIG. 4 and FIG. 5 illustrate relation between the positioning blocks and the workpiece. For the purpose of simplicity, in FIG. 4 and FIG. 5, the first correcting unit 10 and the second correcting unit 20 are not illustrated. Only pressing the workpiece W by the push cylinder 30 causes the workpiece W to be positioned at a location that is slightly rotated clockwise from the first reference surface S1 and the second reference surface S2 as illustrated in FIG. 4. In another case, as illustrated in FIG. 5, the workpiece W is positioned at a location that is slightly rotated counterclockwise from the first reference surface S1 and the second reference surface S2.

In such cases, even when the workpiece W is further pressed by using the push cylinder 30, the workpiece W is not slid on the positioning blocks Bx, By1, and By2 due to the influence of the above-described friction force. In other words, the push cylinder 30 alone may not correct a posture of the workpiece W.

In this regard, according to the present invention, the first correcting unit 10 and the second correcting unit 20 are arranged. The distal ends of the first rollers 15 and 16 and the second rollers 25 and 26 of the pressing members 13 and 23 of the first correcting unit 10 and the second correcting unit 20 are located at more workpiece-side positions than the first reference surface S1 and the second reference surface S2, respectively.

For this reason, when the workpiece W is pressed by the push cylinder 30 to be moved at the steps SP2 and SP3, the workpiece side surface F1 of the workpiece W contacts with the first rollers 15 and 16 first before contacting with the first positioning block Bx (step SP4). In the same manner, the workpiece side surface F2 of the workpiece W contacts with the second rollers 25 and 26 first before contacting with the second positioning blocks By1 and By2 (step SP4).

The first rollers 15 and 16 and the second roller 25 and 26 contact with the workpiece W at lower friction compared with a case of direct contact of the pressing members 13 and 23 with the workpiece W. Then, at the step SP5, these rollers 15, 16, 25, and 26 constantly contact with the workpiece W by biasing force of the springs 14a, 14b, 24a, and 24b, and at the same time, correct a posture of the workpiece W while moving backward by pressing force from the workpiece W.

Figure 6:
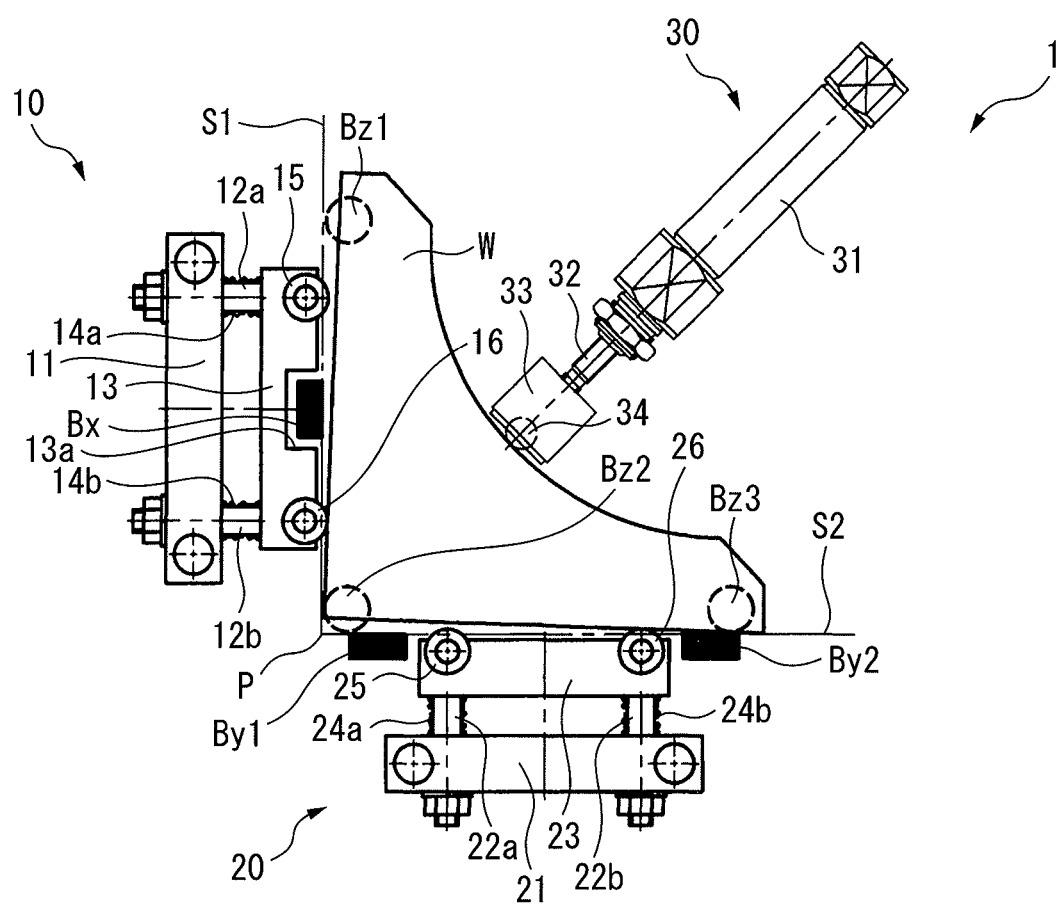
FIG. 6 is a first view for describing operation of the workpiece positioning device in the present invention.
Figure 7:
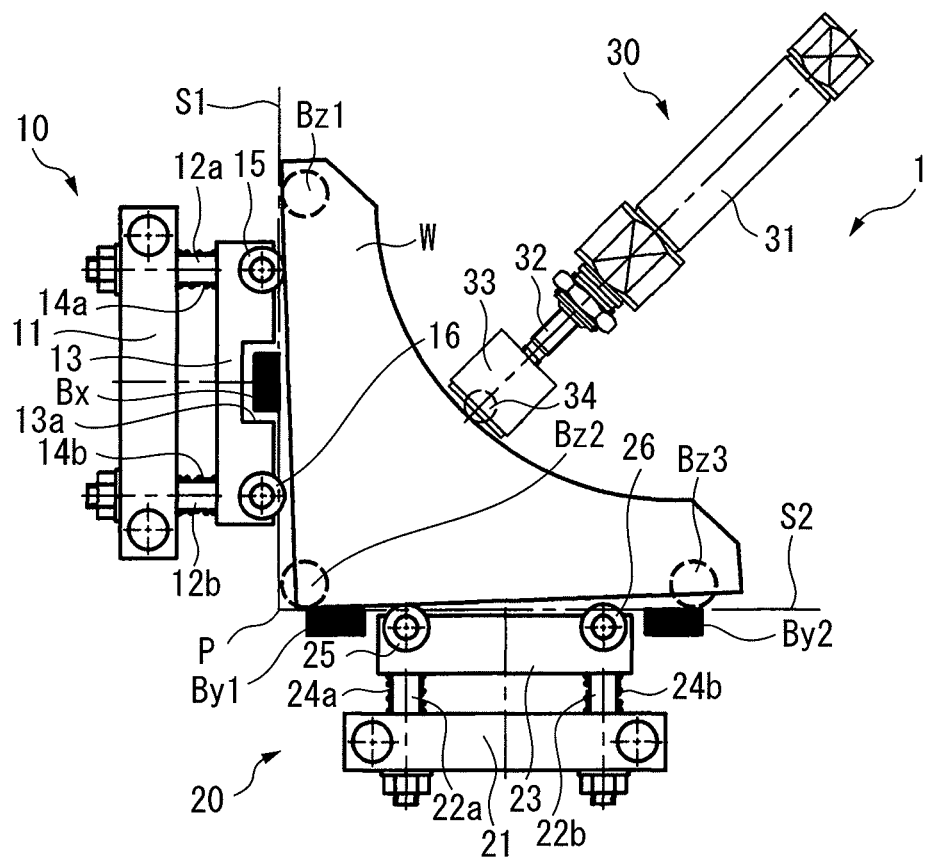
FIG. 7 is a second view for describing operation of the workpiece positioning device in the present invention.

FIG. 6 and FIG. 7 illustrate operation of the workpiece positioning device in the present invention. In FIG. 6 and FIG. 7, the first correcting unit 10 and the second correcting unit 20 are illustrated. FIG. 6 and FIG. 7 respectively correspond to FIG. 4 and FIG. 5 described above.

In the case illustrated in FIG. 6, the first roller 16 of the first correcting unit 10 closer to the intersection line P, and the second roller 26 of the second correcting unit 20 closer to the second positioning block By2 first contact with the workpiece W. Then, at the step SP5, the workpiece W rotates counterclockwise while sliding on the first roller 16 and the second roller 26. As a result, a posture of the workpiece W is corrected.

Further, at the step SP6, the pressing member 13 including the first roller 16 moves backward in the left direction by the pressing force from the workpiece W, and the pressing member 23 including the second roller 26 moves backward in the downward direction by the pressing force from the workpiece W.

Similarly, in the case illustrated in FIG. 7, the first roller 15 of the first correcting unit 10 more distant from the intersection line P, and the second roller 25 of the second correcting unit 20 closer to the second positioning block By1 first contact with the workpiece W. Then, at the step SP5, the workpiece W rotates clockwise while sliding on the first roller 15 and the second roller 25. As a result, a posture of the workpiece W is corrected.

Further, at the step SP6, the pressing member 13 including the first roller 15 moves backward in the left direction by the pressing force from the workpiece W, and the pressing member 23 including the second roller 25 moves backward in the downward direction by the pressing force from the workpiece W.

The ball roller 34 attached to the distal end of the push cylinder 30 contacts with the curved side surface F3 of the workpiece W. Accordingly, an effect of pressing from the push cylinder 30 causes the workpiece W to more easily move rotationally. For this reason, the ball roller 34 is useful in correcting a posture of the workpiece W at the step SP5.

The operation of such backward movement described by using FIG. 6 and FIG. 7 causes the workpiece side surface F1 of the workpiece W to contact with the first positioning block Bx, and causes the workpiece side surface F2 of the workpiece W to contact with the second positioning blocks By1 and By2 so that the workpiece W is precisely positioned with a posture thereof being corrected (step SP7). With this, the positioning operation for the workpiece W is completed (step SP8).

Thus, according to the present invention, the first correcting unit 10 and the second correcting unit 20 as well as the first positioning block Bx and the second positioning blocks By1 and By2 are used. For this reason, even for the workpiece W of a special shape, by only pressing the workpiece W in a single direction by the push cylinder 30, the workpiece side surfaces F1 and F2 of the workpiece W can be precisely positioned at the two different reference surfaces S1 and S2 simultaneously. Therefore, by the workpiece positioning device 1 of the present invention, the workpiece W can be precisely set at a desired machining jig. Accordingly, generation of machining precision defect due to a positioning error at the time of machining the workpiece W by a machining tool can be eliminated.

In FIG. 4, when the first positioning block Bx is arranged at a location closer to the intersection line P with the positions of the second positioning blocks By1 and By2 being maintained, the workpiece W more easily rotates clockwise. In FIG. 5, when the first positioning block Bx is arranged at a location more distant from the intersection line P with the positions of the second positioning blocks By1 and By2 being maintained, the workpiece W more easily rotates counterclockwise.

In this regard, according to the present invention, the first positioning block Bx is arranged approximately at a center of the workpiece side surface F1 of the workpiece W, and the two second positioning blocks By1 and By2 are arranged near both edge portions of the workpiece side surface F2 of the workpiece W, respectively. The first positioning block Bx is arranged between the first rollers 15 and 16. The second rollers 25 and 26 are arranged between the second positioning blocks By1 and By2. With such a configuration, according to the present invention, when the workpiece W is pressed by the push cylinder 30, the workpiece is rotationally moved so that a posture thereof can be corrected, and the workpiece W can be precisely positioned.

Figure 8:
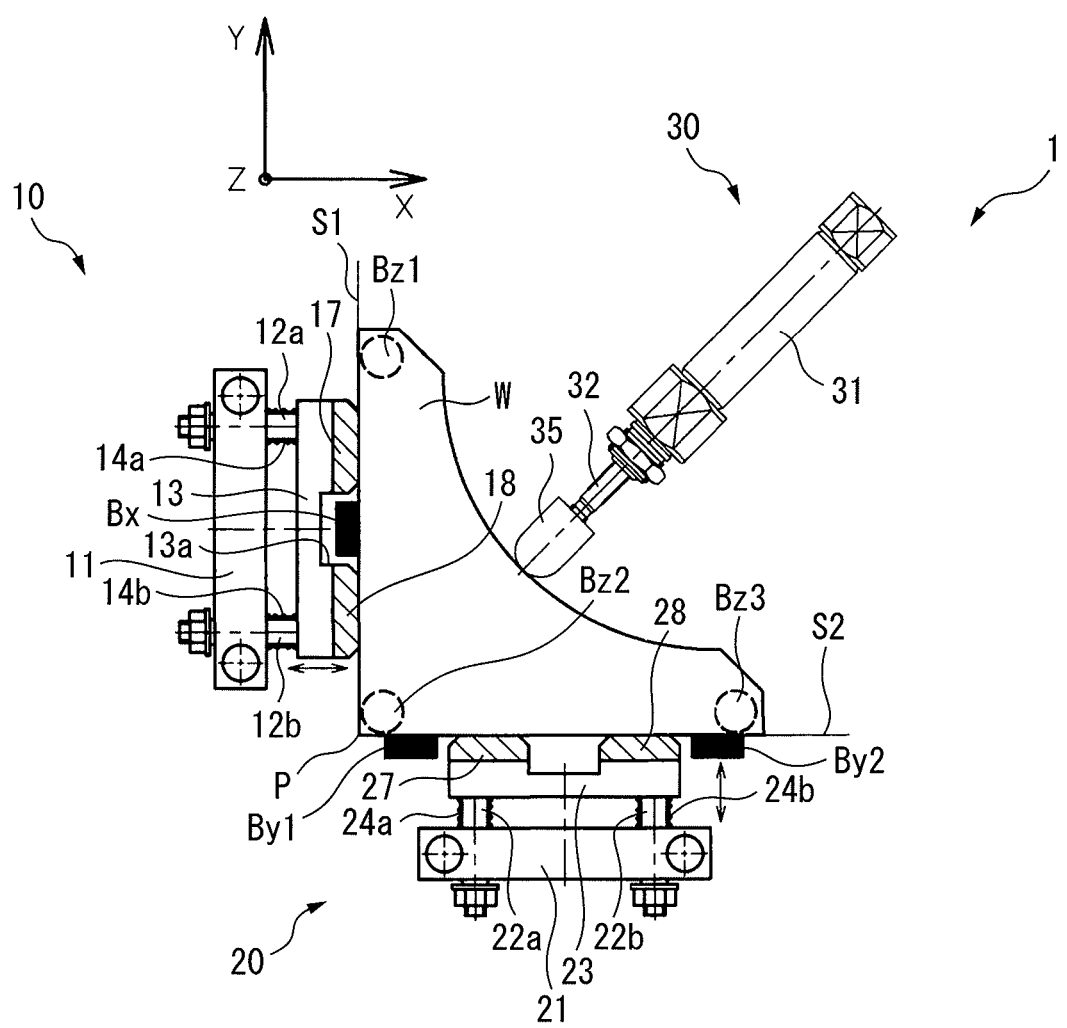
FIG. 8 is an elevational view of a workpiece positioning device based on a different embodiment of the present invention.

By the way, FIG. 8 is an elevational view of a workpiece positioning device based on a different embodiment of the present invention. In FIG. 8, the first rollers 15 and 16 of the pressing member 13 and the second rollers 25 and 26 of the pressing member 23 are excluded. Instead of them, first contacting members 17 and 18 are attached to the pressing member 13, and second contacting members 27 and 28 are attached to the pressing member 23. These first contacting members 17 and 18 and second contacting members 27 and 28 are formed of low-friction resin material, e.g., Teflon (polytetrafluoroethylene) (registered trade mark).

Further, in FIG. 8, the head 33 with the ball roller 34 is excluded. A different head 35 including a hemispherical distal end is attached to a distal end of the rod 32. The head 35 does not include the ball roller 34. The hemispherical distal end thereof contacts directly with the curved side surface F3 of the workpiece W.

In the case of the different embodiment illustrated in FIG. 8, at the step SP4 illustrated in FIG. 3, the workpiece side surface F1 of the workpiece W contacts with the first contacting members 17 and 18 first before contacting with the first positioning block Bx, and the workpiece side surface F2 of the workpiece W contacts with the second contacting members 27 and 28 first before contacting with the second positioning blocks By1 and By2. Then, at the step SP5, the first contacting members 17 and 18 and the second contacting members 27 and 28 constantly contact with the workpiece W by the biasing force of the springs 14a, 14b, 24a, and 24b, and at the same time, correct a posture of the workpiece W while moving backward by the pressing force from the workpiece W.

Accordingly, it would be apparent that even with such a configuration, the same advantageous effect as that described above can be obtained. Furthermore, in the configuration illustrated in FIG. 8, the pressing members 13 and 23 and the push cylinder 30 can be fabricated more simply at a lower cost.

Figure 9:
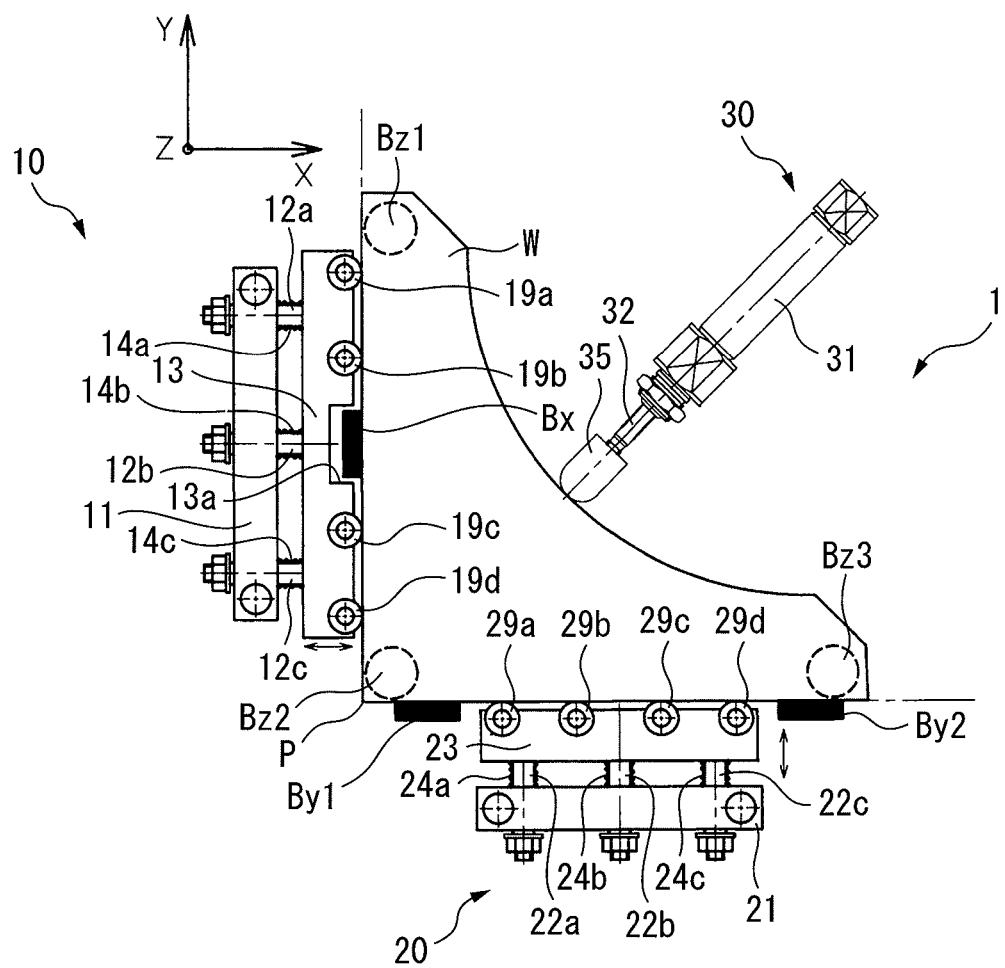
FIG. 9 is an elevational view of a workpiece positioning device based on an additionally different embodiment of the present invention.

Further, FIG. 9 is an elevational view of a workpiece positioning device based on an additionally different embodiment of the present invention. The bases 11 and 21 and the pressing members 13 and 23 depicted in FIG. 9 are longer than in the case illustrated in FIG. 1. In the first correcting unit 10 illustrated in FIG. 9, three post members 12a to 12c extend from the first base 11, and the pressing member 13 is attached to distal ends of the post members 12a to 12c. In the same manner, in the second correcting unit 20, three post members 22a to 22c extend from the second base 21, and the pressing member 23 is attached to distal ends of the post members 22a to 22c.

In addition, four rollers 19a to 19d whose configurations are the same as those of the above-described first rollers 15 and 16 are attached to a distal end of the pressing member 13 so as to be freely rotatable. In the same manner, four rollers 29a to 29d whose configurations are the same as those of the above-described second rollers 25 and 26 are attached to a distal end of the pressing member 23 so as to be freely rotatable.

In the same manner as the representative embodiment of the present invention illustrated in FIG. 1, also in FIG. 9, the first positioning block Bx is arranged between the rollers 19a and 19b and the rollers 19c and 19d of the first correcting unit 10. Further, four rollers 29a to 29d of the second correcting unit 20 are arranged between the second positioning blocks By1 and By2. A larger number of rollers may be attached to the correcting units 10 and 20. A configuration of the push cylinder 30 illustrated in FIG. 9 is the same as that illustrated in FIG. 8, but may be the same as that illustrated in FIG. 1.

In the case of the additionally different embodiment illustrated in FIG. 9, at the step SP4 illustrated in FIG. 3, the workpiece side surface F1 of the workpiece W contacts with the rollers 19a to 19d first before contacting with the first positioning block Bx, and the workpiece side surface F2 of the workpiece W contacts with the rollers 29a to 29d first before contacting with the second positioning blocks By1 and By2. Then, at the step SP5, the rollers 19a to 19d and the rollers 29a to 29d constantly contact with the workpiece W by biasing force of springs 14a, 14b, 14c, 24a, 24b, and 24c, and at the same time, correct a posture of the workpiece W while moving backward by pressing force from the workpiece W.

Accordingly, it would be apparent that even with such a configuration, the same advantageous effect as that described above can be obtained. Further, in the configuration illustrated in FIG. 9, since a large number of the rollers 19a to 19d and 29a to 29d are provided, even a workpiece W of a larger size can be precisely positioned. Furthermore, it would be understood that in the configuration illustrated in FIG. 9, a large number of the rollers 19a to 19d and 29a to 29d exist so that the workpiece W can be slid more smoothly.

Advantageous Effects Of The Invention

According to a first aspect, even in a case of a workpiece having a special shape, by only pressing the workpiece in a single direction by the push cylinder one surface and another surface of the workpiece can be precisely positioned at the two different reference surfaces simultaneously. Accordingly, it is possible to precisely set the workpiece in a desired machining jig, and to eliminate generation of a machining precision defect due to a positioning error when the workpiece W is machined by a machine tool.

According to a second aspect, when the push cylinder presses the workpiece, the workpiece is rotationally moved so that a posture thereof can be corrected, and the workpiece can be precisely positioned.

According to a third aspect, the workpiece is made to more easily move rotationally.

According to a fourth aspect, the contacting members can be simply fabricated at a low cost.

The present invention is described above by using the representative embodiments. However, a person skilled in the art would understand that the above-described modifications and various other modifications, omissions, and additions can be made without departing from the scope of the present invention.

What is claimed is:

1. A workpiece positioning device comprising:
a first positioning block that forms a first reference surface in a first direction, and positions one surface of a workpiece at the first reference surface;
two second positioning blocks that form a second reference surface in a second direction, and position a different surface of the workpiece at the second reference surface;
at least one seat block that positions the workpiece in a third direction perpendicular to the first direction and the second direction;
a push cylinder that presses the workpiece in one direction toward an intersection line between the first reference surface and the second reference surface;
a first unit that, before the first positioning block contacts with the workpiece, contacts with the one surface of the workpiece at friction lower than that of the first positioning block, and corrects a posture of the workpiece; and
a second unit that contacts, before the second positioning blocks contact with the workpiece, with the different surface of the workpiece at friction lower than that of the second positioning blocks, and corrects the posture of the workpiece;
wherein the first unit includes a first pressing member, which is pressed in the first direction toward the workpiece by an elastic member, and at least one pair of first rollers, which are attached to a distal end of the first pressing member and contact with the one surface of the workpiece, the first positioning block is arranged between the at least one pair of first rollers, and
wherein the second unit includes a second pressing member, which is pressed in the second direction toward the workpiece by an elastic member, and at least one pair of second rollers, which are attached to a distal end of the second pressing member and contact with the different surface of the workpiece, the at least one pair of second rollers are arranged between the two second positioning blocks.

2. The workpiece positioning device according to claim 1, wherein a ball is arranged at a distal end of the push cylinder.

3. A workpiece positioning device comprising:
- a first positioning block that forms a first reference surface in a first direction, and positions one surface of a workpiece at the first reference surface;
- two second positioning blocks that form a second reference surface in a second direction, and position a different surface of the workpiece at the second reference surface;
- at least one seat block that positions the workpiece in a third direction perpendicular to the first direction and the second direction;
- a push cylinder that presses the workpiece in one direction toward an intersection line between the first reference surface and the second reference surface;
- a first unit that, before the first positioning block contacts with the workpiece, contacts with the one surface of the workpiece at friction lower than that of the first positioning block, and corrects a posture of the workpiece; and
- a second unit that contacts, before the second positioning blocks contact with the workpiece, with the different surface of the workpiece at friction lower than that of the second positioning blocks, and corrects the posture of the workpiece;
- wherein the first unit includes a first pressing member, which is pressed in the first direction toward the workpiece by an elastic member, and a pair of first contacting members, which are attached to a distal end of the first pressing member and contact with the one surface of the workpiece, the first positioning block is arranged between the pair of first rollers, and
- wherein the second unit includes a second pressing member, which is pressed in the second direction toward the workpiece by an elastic member, and second contacting members, which are attached to a distal end of the second pressing member and contact with the different surface of the workpiece, the second contacting members are arranged between the two second positioning blocks.

4. The workpiece positioning device according to claim 3, wherein a ball is arranged at a distal end of the push cylinder.

* * * * *